Patented Apr. 6, 1954

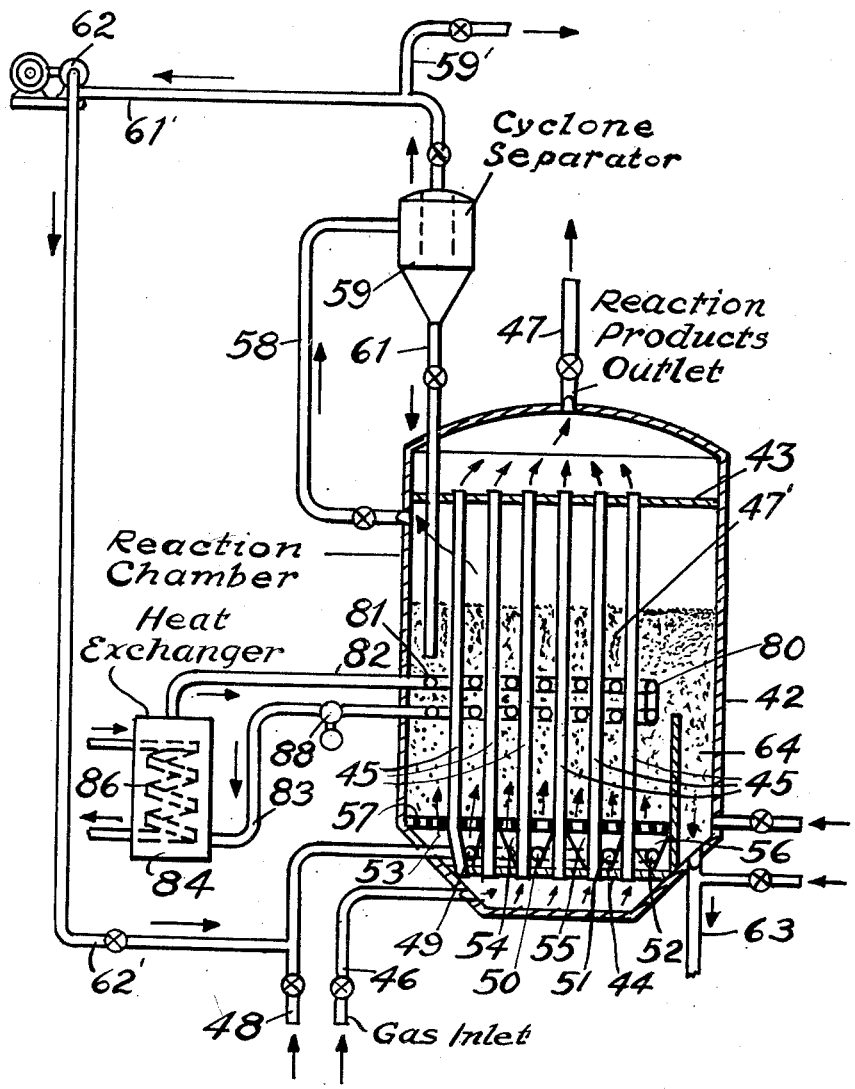

2,674,612

UNITED STATES PATENT OFFICE 2,674,612

CONTROLLING REACTION TEMPERATURES

Eger V. Murphree, Summit, N. J., assignor to Standard Oil Development Company, a corporation of Delaware Application November 26, 1948, Serial No. 61,985

8 Claims. (Cl. 260—451)

This invention relates to a process for controlling the temperature of chemical reactions and pertains more particularly to a method of and apparatus for adding or extracting heat from a reaction zone and for maintaining the temperature within said zone within extremely narrow limits.

The invention finds particular application in reactions carried out at high temperatures and wherein strong heat effects are produced by the reaction, such as in highly exothermic or highly endothermic reactions. Highly exothermic or endothermic reactions carried out at high temperature levels involve difficult problems of temperature control. At lower operating temperatures, regulation or control of temperature may be obtained by a liquid heat exchange medium which may be maintained at a temperature close to the temperature desired for the reaction. This heat exchange medium may be kept in heat exchange relationship with materials undergoing reaction, so that the liquid serves as a thermostat or reservoir for maintaining a close temperature control. For example, it has been a practice to carry out chemical reactions in tubes or other reaction zones immersed in a bath of molten salts and high-boiling organic liquids. While such liquid materals operate satisfactorily at moderately high temperatures, such as temperatures up to about 800° F., molten salt mixtures normally used for this purpose are not capable of operating satisfactorily at higher temperatures, such as temperatures above 900° F.

One of the primary objects of the present invention is to provide an improved process for supplying or extracting heat from a reaction zone.

Another object of the invention is to provide an improved process for controlling reaction temperatures carried out at a high temperature level.

Another important object of the invention is to provide an improved process and apparatus for controlling high temperature reactions within closely confined temperature limits.

Other more specific objects of this invention will be apparent from a detailed description hereinafter.

In accordance with the broader phases of the present invention, a fluidized solid is employed as a heat exchange medium in place of a liquid for adding or extracting heat from a reaction zone. The fluidized solid may be operated successfully at much higher temperatures than in the case of liquid media heretofore employed. The fluidized solid, which forms a heat exchange medium according to the broader phases of the invention, comprises finely divided solids intermixed with a small amount of a gaseous agent, the amount of such gaseous agent being regulated to maintain the solid in a mobile, ebullient state. Under properly controlled conditions, the fluidized solid will tend to seek its own level and otherwise behave in many respects as a liquid. This material is particularly suitable as a heat exchange medium for high temperature operations in which it is desired to maintain a close temperature control of the reaction.

According to one of the more specific phases of the invention, a relatively large body or bath of fluidized material is maintained in intimate heat exchange relationship with the substances undergoing reaction, so that the body of fluidized material is capable of absorbing or liberating relatively large amounts of heat with relatively little change in temperature. When operating in this manner, the relatively large body or bath of fluidized solid serves as a thermostat or heat reservoir to maintain the reaction temperature within closely confined limits. For example, any unexpected surge in heat evolved or liberated during the reaction may be absorbed by the relatively large bath of fluidized solid heat exchange medium with only a relatively small increase in temperature. Conversely, any unexpected loss of heat input during the reaction will be overcome by extracting heat from the fluidized mass of solids with only a small drop in temperature of the fluidized mass.

This is particularly important in cases where uniform temperatures during the reaction are required. For example, in hydrocarbon reactions, in which the present invention finds particular application, the temperature in many cases determines to a large extent which of the many possible types of reactions will predominate. To be more specific, one temperature level may cause a polymerizing reaction to predominate, whereas at another level an entirely different type of reaction, such as cracking, dehydrogenation, or the like may predominate.

The velocity of the gases required to maintain the solids in a dense, turbulent, fluidized state will depend upon the size and density of the solid particles, the viscosity of the gases, and other factors. For example, when employing a solid having a bulk density of about 35 to 50 lbs. per cubic foot and having a particle size between 1 and 100 microns, the velocity of the gases may be of the order of from 0.5 to 5.0 feet per second.

With larger or more dense solid materials, the velocity may be greater.

In order to supply or extract heat from the reaction zone during the reaction, a portion of the fluidized solids may be continuously withdrawn and passed through a heat exchanger in which the solid may be either heated or cooled, depending upon the character of the reaction involved. After modifying the temperature of the solids, they may then be returned to the reaction zone as described in my copending Patent 2,459,836. Alternately, instead of continuously withdrawing a portion of the fluidized mass and modifying the temperature externally of the reaction zone, the reaction chamber in the present invention is provided with heating or cooling elements so as to maintain the temperature at the required level.

A wide variety of different types of solids may be used as the heat exchange medium, such as metal or metal alloy powders, refractory material, such as silica in the form of powdered quartz, fine sand, finely divided silica gel, alumina which may be in the form of powdered Alundum, fused alumina, activated alumina or finely divided alumina gels, clays of various types, and other refractory metallic and non-metallic oxides.

As before mentioned, the invention finds wide application and is particularly suitable for reactions carried out at high temperature levels and wherein it is desired to maintain an extremely close temperature control of the reaction. For example, the invention finds application in various hydrocarbon reactions, such as oil cracking, dehydrogenation, hydrogenation, polymerization, alkylation, isomerization, cyclization, and more complex reactions involving one or more of the above reactions, such as dehydropolymerization, dehydrocyclization, and the like. The invention also finds application in a wide variety of organic and inorganic reactions, such as oxidation, reduction, hydration, dehydration, chlorination, nitration, sulfation, ore roasting and reduction, and calcination.

One type of reaction in which the invention finds particular application is the conversion of methane into higher molecular weight hydrocarbons. This conversion, for example, may involve partial dehydrogenation of the methane to form free methyl radicals followed by the polymerization of the radicals into higher molecular weight products, or oxidation or chlorination of the methane followed by dehydration or dechlorination. In such operations the hydrogen may be extracted from the methane as such or the methane may be caused to react with a hydrogen acceptor. Of the various types of hydrogen acceptors, free oxygen is the most feasible from a practical viewpoint. This reaction, however, of methane with oxygen to eliminate partially the hydrogen evolves large quantities of heat and since the reaction itself requires relatively high temperatures, such as from 1500° F. to 2500° F., control of temperature is particularly difficult. A further process in which the invention finds particular application is in the conversion of butene to butadiene, or the formation of diolefins from mono-olefins. These reactions normally require relatively high temperatures, such as of the order of from 1100° F. to 1400 F., and extremely short contact periods. Furthermore, it is necessary in such operations to maintain extremely close temperature control over the reaction.

For a better understanding of the invention, reference will now be made to the accompanying drawing which represents an apparatus showing parts in section capable of carrying the process into effect.

In this apparatus the fluidized solid forms a bath surrounding tubes or other retorts in which the reaction takes place. In other words, the drawing illustrates an apparatus in which the heat exchange is accomplished by indirect heat exchange relationship between the finely divided solids and the reaction gases.

Referring more particularly to the drawing, the reference character 42 designates the outer shell of a reaction chamber. A header 43 is provided in the upper portion of the reaction chamber and a lower header 44 is provided in the bottom portion. These two headers are interconnected with a multiplicity of reaction tubes 45. Gases or liquid to be reacted may be introduced below the bottom header 44 through line 46 and thence pass upwardly as a homogeneous vapor phase through the reaction tubes 45 above the upper header 43 from whence the reaction products are removed through line 47. Surrounding the reaction tubes and within the outer shell 42 is maintained a permanent dense, fluidized mass 47' of finely divided solid heat exchange medium. The gases required to maintain the solid in freely flowing, turbulent, fluidized state are introduced through line 48. The line 48 may be provided with a plurality of branch lines 49, 50, 51 and 52 extending transversely across the reaction chamber above the bottom header 44. The branch lines 49 to 52, inclusive, are provided with perforations from which the fluidizing or aerating gas discharges into a plurality of parallel trough-shaped distributing zones 53, 54, 55 and 56. These trough-shaped distributing zones are indicated more clearly in the broken sections of the drawing. The upper portion of the distributing zones 53 to 56, inclusive, is provided with a perforated grid 57 through which the fluidized gases pass into the main body of the chamber around the reaction tubes.

The velocity of the gaseous fluidizing agent introduced into the main body of the chamber is controlled, as previously described, to maintain the solid material in a dense, fluidized, turbulent condition. The amount of fluidized solids maintained within the outer shell 42 is preferably large as compared with the weight of gases in the reaction zone, so that the fluidized bath is capable of absorbing relatively large quantities of heat with only a small rise in temperature, as described previously. The fluidizing gas after passing through the fluidized bath of solid material surrounding the reaction tubes 45 is removed from the upper section of the shell through line 58 and may be passed to a cyclone separator 59 or other suitable separating device for removal of the solids therefrom. The gases after passing through the cyclone separator 59 may be rejected from the system through line 59' or they may be compressed and recycled to line 48 and the distributing chambers 53 to 56, inclusive, through line 61' and compressor 62 and line 62'.

In the drawing there is shown a heat exchange coil 80 imbedded in the dense fluidized mass 47' in shell 42 of the reaction zone. This coil 80 is adapted to conduct a heat exchange medium in indirect heat exchange with the fluidized mass for adding heat to or extracting heat from the fluidized mass which in turn controls the temperature of the reactants passing through tubes 45. The coil 80 as shown comprises tubes 81 arranged in horizontal planes with the tubes 81 placed between rows of vertical tubes 45, the tubes 81 having cross-over connections at the ends to connect with the tubes between the next or adjacent row of tubes 45. As shown there are two rows of tubes 81 with one row above the other but any number of tubes or rows of tubes may be used. The invention is not restricted to the form of heat exchange unit 80 shown as any desirable heat exchange unit may be used and imbedded in fluidized mass 47'.

The coil 80 has lines 82 and 83 which extend to the outside of shell 42 and communicate with a heat exchanger 84 having a coil 86 for supplying heat to or removing heat from the heat exchange medium to be circulated through coil 80. A pump 88 is provided in line 83 for circulating the heat exchange medium through the coil 80 and external heat exchanger 84.

The heat exchange medium passing through the heat exchanger coil 80 may be a liquid medium such as water, molten salt solutions, mercury, diphenyl, or a gas such as superheated steam, etc., the selection of the particular heat exchange medium not being the essence of this invention.

The heat exchanger 84 is shown with a coil 86 as the heat exchange unit but other forms may be used and heat may be added or removed from heat exchanger 84 by a heat exchange medium as above described in connection with coil 80 or other methods may be used. For example, for adding heat to the heat exchange medium circulating through coil 80, a suitable fuel may be burned in coil 86 of the heat exchange unit 84. For removing heat from the heat exchange medium circulating through coil 80, the heat exchanger 84 may be a waste heat boiler or the like. These examples are given merely as illustrations and are not intended to limit the invention.

The reactants passing through line 46 and tubes 45 may contain a small amount of powdered catalyst as a dilute suspension or large amounts of powdered catalyst to form dense fluidized mixtures.

There is exceedingly good heat exchange between the coil 80 in the dense layer or bed 47' because of the liquid-like characteristics of the dense dry bed 47' and also because of the turbulence in the bed.

From the above description, it will be apparent that in the modifications illustrated the temperature of a reaction is controlled within narrowly defined limits by employing a finely divided, fluidized mass of solid material rather than a liquid heat exchange medium.

This case is filed as a continuation in part of my application Serial No. 468,630 filed December 11, 1942 and now issued as U. S. Patent 2,459,836.

Having described the preferred embodiment of the invention, it will be understood that it embraces such other variations and modifications as come within the spirit and scope thereof.

I claim:

1. A process for controlling reaction temperatures which comprises, passing a multiplicity of confined, elongated streams of gaseous reactants through a relatively large permanent body of dense, finely divided fluidized solid material in indirect heat exchange relationship therewith, passing a fluidizing gas upwardly through said body of solids at a velocity adjusted to maintain a turbulent dense fluidized layer of solids on which is superposed a dispersed phase, the quantity of said fluidized solid material being sufficient to absorb relatively large amounts of heat with minimum rise in temperature whereby said fluidized solid serves as a relatively constant temperature bath, withdrawing reaction products from the plurality of confined streams and separately withdrawing fluidizing gas from the dispersed phase superposed on the dense fluidized layer and regulating the temperature of said dense layer to maintain the reaction temperature within predetermined limits by maintaining a heat exchange medium in a zone which is immersed within and in indirect heat exchange with said dense fluidized layer of solids.

2. A process according to claim 1 wherein the fluidizing gas passed through the solid material is inert and wherein the heat exchange medium is removed from the zone which is maintained in indirect heat exchange with the dense fluidized layer, the temperature of the removed heat exchange medium is modified and the medium thereafter returned to said indirect heat exchange zone.

3. A process according to claim 1 wherein the finely divided fluidized solid material has a melting point above the desired reaction temperature and wherein the fluidizing gas is inert with respect to said solid material.

4. A process according to claim 3 wherein a stream of the heat exchange medium is circulated between the zone maintained in indirect heat exchange with said dense fluidized layer and an external zone wherein the temperature of the circulating medium is modified by indirect heat exchange.

5. A process for controlling the temperatures of highly exothermic chemical reactions which comprises, passing a multiplicity of narrow confined elongated streams consisting essentially of gaseous reactants at temperatures above 900° F. through and in indirect heat exchange relationship with a relatively large permanent body of finely divided fluidized solid material having a melting point above the desired reaction temperature, passing a fluidizing gas upwardly through said body of solids at a velocity adjusted to maintain a turbulent dense fluidized layer of solids on which is superposed a dispersed phase, withdrawing reaction products from the multiplicity of confined streams and separately withdrawing fluidizing gas from said body of solids, the amount of said solids being large as compared with the weight of the reactant present in the confined streams so that the fluidized solids are capable of absorbing large quantities of heat with only a small rise in temperature and controlling the temperature of said dense layer to prevent undue rise therein by maintaining a cooling heat exchange medium in a zone which is immersed within and in indirect heat exchange with said dense layer, removing heat exchange medium from said heat exchange zone, cooling said heat exchange medium and returning it to said heat exchange zone to remove heat from said dense layer and maintain said reaction temperature within the desired limits.

6. A process according to claim 5 wherein said heat exchange medium is a liquid and is passed as a confined stream through said dense fluidized layer in indirect heat exchange relationship therewith.

7. A process according to claim 5 wherein the reactant comprises a mixture of methane and oxygen at a reaction temperature between 1500 and 2500° F. and wherein high molecular weight hydrocarbon products are formed.

8. A process for controlling the temperatures of highly exothermic chemical reactions which comprises, carrying out said reactions by passing the reactant as a multiplicity of homogeneous vapor phase streams through and in indirect heat exchange relationship with a large permanent body of finely divided fluidized solid material having a melting point above the desired reaction temperature, passing a gas upwardly through said solids at a velocity adjusted to maintain a turbulent dense fluidized layer of solids on which is superposed a dispersed phase, removing gas from said dispersed phase as a separate stream, withdrawing reaction products from the multiplicity of streams and separately withdrawing fluidizing gas from said body of solids, and controlling the temperature of said dense layer to prevent undue rise therein by maintaining a cooling heat exchange medium in a zone which is immersed within and in indirect heat exchange with said dense layer, removing heat exchange medium from said heat exchange zone, cooling said heat exchange medium and returning it to said heat exchange zone to remove heat from said dense layer and maintain said reaction temperature within the desired limits.

References Cited in the file of this patent

UNITED STATES PATENTS

| Number | Name | Date |
|---|---|---|
| 1,995,136 | Winkler et al. | Mar. 19, 1935 |
| 2,326,705 | Thiele et al. | Aug. 10, 1943 |
| 2,412,025 | Zimmerman | Dec. 3, 1946 |
| 2,428,872 | Gunness | Oct. 14, 1947 |
| 2,459,836 | Murphree | Jan. 26, 1949 |

FOREIGN PATENTS

| Number | Country | Date |
|---|---|---|
| 587,774 | Great Britain | May 6, 1947 |